United States Patent
Bahr

(10) Patent No.: US 8,964,597 B2
(45) Date of Patent: Feb. 24, 2015

(54) METHOD FOR EXCHANGE OF ROUTING MESSAGES IN A WIRELESS MESHED COMMUNICATION NETWORK

(75) Inventor: Michael Bahr, München (DE)

(73) Assignee: Siemens Aktiengesellschaft, Munich (DE)

( * ) Notice: Subject to any disclaimer, the term of this patent is extended or adjusted under 35 U.S.C. 154(b) by 331 days.

(21) Appl. No.: 13/128,601

(22) PCT Filed: Mar. 3, 2010

(86) PCT No.: PCT/EP2010/052652
§ 371 (c)(1),
(2), (4) Date: May 10, 2011

(87) PCT Pub. No.: WO2010/100172
PCT Pub. Date: Sep. 10, 2010

(65) Prior Publication Data
US 2012/0020244 A1    Jan. 26, 2012

(30) Foreign Application Priority Data
Mar. 6, 2009 (EP) ..................... 09003270

(51) Int. Cl.
*H04L 12/28* (2006.01)
*H04W 40/26* (2009.01)
(Continued)

(52) U.S. Cl.
CPC ............... *H04W 40/26* (2013.01); *H04L 45/00* (2013.01); *H04W 84/18* (2013.01)
USPC .......................................................... 370/254

(58) Field of Classification Search
None
See application file for complete search history.

(56) References Cited

U.S. PATENT DOCUMENTS

| 7,116,654 | B2 | 10/2006 | Kim ............................. 370/338 |
| 8,000,267 | B2* | 8/2011 | Solis et al. ..................... 370/256 |
| 8,165,040 | B2* | 4/2012 | Yang et al. ..................... 370/255 |

(Continued)

FOREIGN PATENT DOCUMENTS

| CN | 1402493 A | 3/2003 | ............. H04L 12/28 |
| EP | 1379034 A1 | 1/2004 | ............. H04L 12/24 |

(Continued)

OTHER PUBLICATIONS

Bahr, M., "Update on the Hybrid Wireless Mesh Protocol of IEEE 802.11s", Mobile Adhoc and Sensor Systems, IEEE International Conference On, IEEE, Pl, 1; 6 pages, 2007.

(Continued)

*Primary Examiner* — Ayaz Sheikh
*Assistant Examiner* — Blanche Wong
(74) *Attorney, Agent, or Firm* — King & Spalding L.L.P.

(57) ABSTRACT

In a method for exchanging routing messages in a wireless meshed communication network with network nodes and a root node, a routing tree is set up with data transmission paths. The root node sends routing requests at regular time intervals to set up the paths, wherein a request contains a specification for a first bidirectional path mode or a second unidirectional path mode. At a respective node, a first field is used to indicate a first or a second node state. If, upon receipt of a request, the first field is in the first state, a routing response is always sent and otherwise not. Next, the node checks the mode specified in the request, ensuring that the respective mode is set. In case of a node to root data transmission, a node also ensures that the first field of the respective network node is in the first state.

20 Claims, 5 Drawing Sheets

(51) Int. Cl.
*H04L 12/701* (2013.01)
*H04W 84/18* (2009.01)

(56) References Cited

U.S. PATENT DOCUMENTS

| | | | | |
|---|---|---|---|---|
| 8,289,883 B2* | 10/2012 | Zhu et al. | | 370/255 |
| 8,312,166 B2* | 11/2012 | Epstein et al. | | 709/238 |
| 8,340,131 B2* | 12/2012 | Sharp et al. | | 370/474 |
| 8,638,695 B2* | 1/2014 | Zheng et al. | | 370/256 |
| 2007/0189252 A1* | 8/2007 | Kawakami | | 370/338 |
| 2010/0214960 A1 | 8/2010 | Bahr et al. | | 370/255 |
| 2010/0260153 A1* | 10/2010 | Hollick et al. | | 370/336 |
| 2012/0020244 A1 | 1/2012 | Bahr | | 370/254 |

FOREIGN PATENT DOCUMENTS

| | | | | |
|---|---|---|---|---|
| JP | 2010509877 A | 3/2010 | | H04W 40/02 |
| WO | 2008/058933 A1 | 5/2008 | | H04L 12/56 |
| WO | 2010/100172 A1 | 9/2010 | | H04W 40/26 |

OTHER PUBLICATIONS

IEEE P802.11s/D2.07, "Draft Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications, Amendment 10: Mesh Networking", 802.11 Working Group of the IEEE 802 Committee; 247 pages, Jan. 2009.

International PCT Search Report and Written Opinion, PCT/EP2010/052652, 13 pages, May 26, 2010.

Japanese Office Action, Application No. 2011-543782, 16 pages (German), Feb. 22, 2013.

Chinese Office Action, Application No. 201080003174.3, 12 pages, May 6, 2013.

* cited by examiner

METHOD FOR EXCHANGE OF ROUTING MESSAGES IN A WIRELESS MESHED COMMUNICATION NETWORK

CROSS-REFERENCE TO RELATED APPLICATIONS

This application is a U.S. National Stage Application of International Application No. PCT/EP2010/052652 filed Mar. 3, 2010, which designates the United States of America, and claims priority to EP Application No. 09003270.7 filed Mar. 6, 2009. The contents of which are hereby incorporated by reference in their entirety.

TECHNICAL FIELD

The invention relates to method for exchange of routing messages in a wireless meshed communication network, with a plurality of network nodes, and also to a corresponding network node and to a wireless meshed communication network.

BACKGROUND

A plurality of different mechanisms is known from the prior art governing how data can be routed in communication networks with a plurality of network nodes along paths in the network. In publication WO 2008/058933 A1 a method is described for setting up bidirectional data transmission paths in a wireless meshed communication network with a plurality of network nodes. In this patent a routing tree is established starting from a node functioning as a root node between the wirelessly communicating network nodes, with the root node transmitting routing requests to the network nodes at regular intervals for creating the routing tree. Using the routing requests in this case a unidirectional data transmission path from the respective network nodes in the routing tree through to the root node is established first of all. By using two flags in the respective network node it can be achieved that under specific circumstances in response to a received routing request a routing reply is also sent back to the root node which causes a return path to be established from the root network node to the network node sending the routing reply. This enables a bidirectional data transmission path to be created between root network node and the network node sending the routing reply if necessary. In this publication it is not specified how a change between a mode in which bidirectional data paths are created and a mode in which only unidirectional data paths are created can be initiated by the root node.

In Standard IEEE 802.11s, which describes data transmission in the L2 layer in wireless meshed networks, the HWMP protocol (HWMP=Hybrid Wireless Mesh Protocol) for setting up data transmission paths is described. A routing tree is created with this protocol proactively with the aid of routing requests which are sent out from the corresponding root node in the routing tree. In this case a flag in the routing requests is used to specify whether in response to the receipt of a routing request in a network node a corresponding routing reply is to be sent out, i.e. whether a mode for establishing unidirectional or bidirectional data transmission paths is to be used. There is no description of how, by setting flags in the network node without explicit account taken of the mode in the routing reply, a switch can be made between the modes.

SUMMARY

According to various embodiments, in a wireless meshed communication network, an exchange of routing messages can be made possible so that a switch can be made in a uniform method between a mode with unidirectional data transmission and a mode with bidirectional data transmission.

According to an embodiment, in a method for exchange of routing messages in a wireless meshed communication network with a plurality of network nodes, with a routing tree with data transmission paths between the network nodes being established in the communication network and one of the network nodes being a root node which represents the root of the routing tree:
the root node sends routing requests at regular intervals to the network nodes for establishing the data transmission paths, with a first mode for setting up bidirectional data transmission paths or a second mode for setting up unidirectional data transmission paths being specified in the respective routing request;
a first or second state of the respective network node is indicated by a first field in the respective network node;
if on receipt of a routing request in a respective network node the first field of the respective network node is in the first state, a routing reply is always sent out by the respective network node otherwise no routing reply is sent out by the respective network node, with the mode specified in the received routing request being checked by the respective network node, with it being ensured that the first field is in the first state if the received routing request specifies the first mode and otherwise it being ensured that the first field is in the second state;
it is insured by respective network node in the event of the data transmission from the respective network node through to the root node that the first field of the respective network node is subsequently in the first state.

According to a further embodiment, in a respective network node a third or fourth state of the respective network node can be indicated by a second field, with the respective network node setting the second field to the third state after the sending out of a routing reply. According to a further embodiment, in a respective network node, as a reaction to the receipt of a routing request, the following steps: a) to c) may always be executed one after the other: a) Setting the second field of the respective network node to the fourth state; b) Checking the state of the first field of the respective network node, whereby
if the first field is in the first state, a routing reply is sent out by the respective network node and subsequently the first field is set to the first state and the second field is set the third state;
if the first field is in the second state, no routing reply is sent out by the respective network node and the first field and the second field remain unchanged; c) Checking the mode which is specified in the received routing request, whereby—if the first mode is specified in the received routing request, the first field is set to the first state and the second field remains unchanged;
if the second mode is specified in the received routing request, the first field and the second field remain unchanged. According to a further embodiment, in a respective network node as a reaction to the receipt of a routing request the following steps: i) and ii) may always be executed one after the other: i) Checking the state of the first field of the respective network node, whereby
if the first field is in the first state a routing reply is sent out by the respective network node, the second field of the respective network node is set to the third state and the first field remains unchanged;

if the first field is in the second state, no routing reply is sent out by the respective network node and the second field is set to the fourth state and the first field remains unchanged; ii) Checking the mode which is specified in the received routing request, whereby if the first mode is specified in the received routing request, the first field is set to the first state and the second field remains unchanged; —if the second mode is specified in the received routing request, the first field in is set the second state and the second field remains unchanged.

According to a further embodiment, a respective network node depending on one or more criteria and especially always may execute the following step: Sending a routing reply before the beginning of the data transmission from the respective network node through to the root node if the second field of the respective network node is in the fourth state.

According to a further embodiment, if the condition obtains that in a respective network node a routing request with a specified first mode is received and the first field is in the second state, a routing reply can be sent out by the respective network node as a reaction to the received routing request.

According to a further embodiment, if the condition obtains that in a respective network node a routing request with a specified first mode is received and the first field is in the second state, after the sending out of the routing reply in the second network node the first field can also be set to the first state and the second field is set to the third state.

According to a further embodiment, the communication network may operate in accordance with Standard IEEE 802.11s and the routing requests and routing replies are proactive Path Requests and Path Replies in accordance with the HWMP (HWMP=Hybrid Wireless Mesh Protocol) of this standard.

According to a further embodiment, the first and second mode in the routing request and/or the first and second state of the first field of a respective network node and/or the third and fourth state of the second field of a respective network node can be specified by way of the state of a flag.

According to another embodiment, a network node for use in a wireless meshed communication network, in which a method as described above is carried out, with a routing tree being established in the communication network with data transmission paths between the network nodes and one of the network nodes being a root node which represents the root of the routing tree, the network node may comprise: —a first means for receiving routing requests, which the root node sends out at regular intervals to the network nodes for setting up the data transmission paths, with a first mode for setting up bidirectional data transmission paths or a second mode for setting up unidirectional data transmission paths being specified in a respective routing request; —a second means for setting a first or second state in a first field; —a third means for sending out routing replies, which is designed such that, if on receipt of a routing request by the first means the first field of the network node is in the first state, a routing reply is always sent out by the third means and otherwise no routing reply is sent out by the third means, with the mode specified in the received routing request subsequently being checked, with it being insured that the first field is in the first state if the received routing request specifies the first mode, and it being insured otherwise that the first field is in the second state, with it further being insured that in the event of a data transmission from the network node through to the root node the first field is subsequently in the first state.

According to a further embodiment of the network node, the network node may comprise one or more further means for carrying out the method as described above.

According to yet another embodiment, in a wireless meshed communication network with a plurality of network nodes, the network nodes may be configured for carrying out a method as described above.

BRIEF DESCRIPTION OF THE DRAWINGS

Exemplary embodiments are explained in detail below with reference to the enclosed figures, in which.

DETAILED DESCRIPTION

Figure 1:
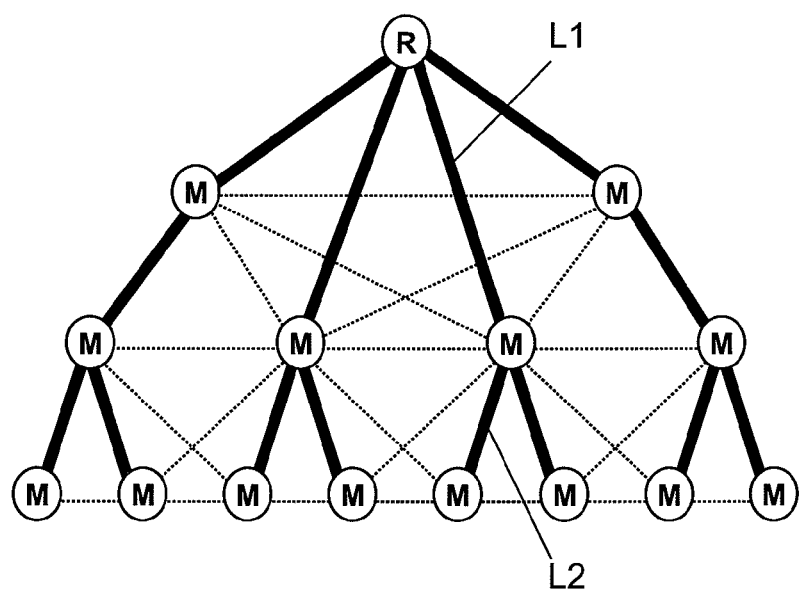
FIG. 1 shows a schematic diagram of a meshed wireless packet switched communication network, in which routing messages are exchanged based on various embodiments.

In the method according to various embodiments routing messages are exchanged in a wireless meshed communication network with a plurality of network nodes, wherein in the communication network a routing tree with data transmission paths between the network nodes is established and one of the network nodes is a root node which represents the root of the routing tree. Here and below nodes in the communication network which do not correspond to the root node are referred to as network nodes while the network node functioning as the root node is always explicitly called the root node.

To establish the data transmission paths the root node sends routing requests to the network nodes at regular intervals. The routing requests in such cases are forwarded by the network nodes in the communication network. Corresponding routing information is specified in the individual network nodes in this way using methods known per se with which the forwarding of data packets from a network node the next network node through to the root node over defined data transmission paths is made possible. In the method according to various embodiments a first and a second mode are specified in the respective routing request. The first mode in this case corresponds to a mode for establishing bidirectional data transmission paths between root node and respective network node. The second mode by contrast is a mode for establishing unidirectional data transmission paths from the respective network node to the root node. The particular characteristic of the first mode is that, after creation of the first mode in the communication network, a respective network node always sends a routing reply to the root node in reaction to receiving a routing request. By contrast the second mode is especially characterized by the fact that, after creation of the second mode in the communication network, a respective network node does not always send a routing reply to the root node in reaction to receiving a routing request. The term "after creation of the first or second mode" is to be understood as no mode change being carried out in which under some circumstances the specified conditions for the first or the second mode do not yet exist for a specific period.

In the first mode described above it is achieved that after receipt of a routing request in a network node which results in the establishment of a data transmission path from the network node to the root node, a path is also established in the opposite direction by means of routing replies sent out, so that bidirectional data transmission paths are present in the routing tree. This is not the case in the second mode since here, as a reaction to the receipt of a routing request no routing reply is transmitted by a network node as a rule. Nonetheless there is also the option in the second mode of sending out corresponding routing replies, however the sending out of these routing replies—unlike the first mode—is not or is only under exceptional circumstances or if required coupled to the receipt of a routing request.

In the method according to various embodiments a first or a second state of the respective network node is shown in a respective network node via a first field. This first field specifies the sending out of routing replies—and this is done independently of the first or second mode specified in the routing request. According to various embodiments, in the event of the first field of the respective network node being in the first state on receipt of a routing request in the respective network node, a routing reply, i.e. independently of the specified mode in the routing request, is always sent out by the respective network node. Otherwise, i.e. if the first field is in the second state, no routing reply is sent out by the respective network node. Subsequently the mode specified in the received routing request is checked by the respective network node. In this case it is ensured that the first field is in the first state after checking if the received routing reply specifies the first mode. This can be achieved for example by setting a first field to the first state (independently of the current state of the field). Otherwise, i.e. if the second mode is specified in the routing request, it is ensured that the first field is in the second state. This can be achieved for example by setting the first field to the second state or will y a first field already set before the checking of the mode to the second state not being changed any more.

In addition in the method according to various embodiments it is ensured by the respective network node in the event of the data transmission from the respective network node through to the root node that the first field of the respective network node is subsequently (i.e. after the data transmission) in the first state. This can be achieved in the first state by setting the first field (independently of its current state).

The method according to various embodiments, without explicitly defining modes in the individual network nodes, makes possible operation in a first mode with bidirectional data transmission paths and in a second mode with unidirectional data transmission paths. In addition it is guaranteed independently of the mode in the event of a data transmission that a return path from the root node to the corresponding network node is also established for the transmitted data.

In an embodiment of the method, a second field is used in a respective network node as well as the first field by which a third or a fourth state of the network node is shown, with the respective network node setting the second field to the third state after sending out a routing reply.

In a first embodiment of the method, in the respective network nodes, as a reaction to the receipt of a routing request, the following steps a) to c) are always executed one after the other:

a) Setting the second field of the respective network node to the fourth state;

b) Checking the state in which the first field of the respective network node is whereby,
if the first field is in the first state, a routing reply is sent out by the respective network node and subsequently the first field is set to the second state and the second field is set to the third state;
if the first field is in the second state, no routing reply is sent out by the respective network node and the state of the first field and of the second field remains unchanged;

c) Checking which mode is specified in the received routing request whereby,
if the first mode is specified in the received routing request, the first field is set to the first state and the second field remains unchanged;
if the second mode is specified in the received routing request, the state of the first field and of the second field remain unchanged.

In an alternate embodiment of the method, in a respective network node, as a reaction to the receipt of a routing request the following steps i) and ii) are always executed one after the other:

i) Checking the state of the first field of the respective network node, whereby
if the first field is in the first state a routing reply is sent out by the respective network node, the second field of the respective network node is set to the third state and the first field remains unchanged;
if the first field is in the second state, no routing reply is sent out by the respective network node and the second field is set to the fourth state and the first field remains unchanged;

ii) Checking which mode is specified in the received routing request whereby,
if the first mode is specified in the received routing request, the first field is set to the first state and the second field remains unchanged;
if the second mode is specified in the received routing request, the first field is set to the second state and the second field remains unchanged.

In a further embodiment of the method a respective network node carries out the following steps as a function of one or more criteria and especially always:

Sending a routing reply before the beginning of a data transmission by the respective network node to the root node if the second field of the respective network node is in the fourth state. In this way it is ensured that, even before the data transmission, by sending out the routing reply a return path is established from the root node to the respective network node. It is thus specified by the criterion or the criteria whether the respective network node wishes to set up a return path and thereby a bidirectional data transmission path at the time of the data transmission.

In a further embodiment of the method a delay in sending out the routing reply is avoided on switching from the second mode to the first mode. This is achieved, if the condition obtains in which a routing request with a specified first mode is received in a respective network node and the first field is in the second state, by a routing reply being sent out in reaction to the received routing request by the respective network node. In accordance with the variants described above in which a second field is also defined in the respective network node, if this condition obtains the first field is also set to the first state and the second field is set the third state after the routing reply is sent out in the respective network node.

The method according to various embodiments is especially used in a communication network which operates in accordance with the IEEE 802.11s Standard. In this case the routing requests or the routing replies respectively represent proactive path requests or path replies in accordance with the HWMP protocol defined in this Standard.

In a further embodiment of the method the first and second mode in the routing request and/or the first and second state in the first field of a respective network node and/or the third and fourth state in the second field of the respective network node are specified with the state of a flag. In this case one state is indicated by the set flag and the other state by the non-set flag.

As well as the method described above, various other embodiments further relate to a network node for use in a wireless meshed communication network in which the method is executed, with a routing tree being established in the communication network with data transmission paths between the network nodes and one of the network nodes being a root node which represents the root of the routing tree. In such cases the network node comprises a first means for receiving routing requests that the root node sends out at regular intervals to the network nodes for establishing the data transmission paths, with a first mode for establishing bidirectional data transmission paths and a second node for establishing unidirectional data transmission paths being specified in a respective routing request. The network node further comprises a second means for setting a first or second state in a first field. In addition a third means is provided the sending out routing replies, with this third means being embodied such that, if on receipt of a routing request by the first means the first field of the network node is in the first state, a routing reply is always sent out by the third means, with otherwise no routing reply being sent out by the third means, wherein subsequently the mode specified in the received routing request is checked and it is ensured that the first field is in the first state, if the received routing request specifies the first mode and otherwise it is ensured that the first field is in the second state, with it further being ensured that, in the event of a data transmission from the network node through to the root node, the first field is in the first state.

The network node just described can be preferably embodied such that it comprises one or more further means for executing each variant of the method described above.

Other embodiments also relate to a wireless meshed communication network with a plurality of network nodes, in which the network nodes are configured for carrying out the method.

FIG. 1 shows a schematic diagram of a meshed wireless communication network in which, for routing of data packets, an embodiment in accordance with the method are used. The communication network comprises a plurality of network nodes which are shown as circles, with the network nodes able to communicate wirelessly with each other. The communication paths between the network nodes are indicated on the one hand by solid lines and on the other hand by dashed lines. The communication network of FIG. 1 is based on Standard IEEE 802.11s, which specifies the exchange of data in the L2 layer in meshed communication networks. For forwarding the data packets in this case the path selection protocol HWMP (HWMP=Hybrid Wireless Mesh Protocol) is used which is operated in accordance with embodiments below in the so-called "Proactive Tree Building Mode". In this case a routing tree is built starting from a root node to the remaining network nodes of the communication network. Such a routing tree is shown in FIG. 1 by the solid black lines, with the root node being labeled with the reference character R and all other nodes with reference character M. The designation "network node" is always used below for the nodes M dependent on the root node R, whereas the root node is always referred to as such.

The routing tree shown is built proactively using the said tree building mode using the transmission of so-called proactive routing requests which are referred to in the protocol as proactive Path Requests PREQ. These proactive routing requests are sent out periodically by the root network node R and represent a specific path request message in the protocol in which the fields of the destination address are all set to "1" (corresponds to the so-called broadcast address) and the so-called Target-Only-Flag and also the so-called Reply-And-Forward-Flag are likewise set to "1". The result of this is that the routing requests represent broadcast messages which are processed by each of the receiving network nodes M. The routing tree is created based on these routing requests with standard mechanisms using distance vectors and link state protocols, as are provided in the above-mentioned HWMP routing protocol of Standard IEEE 802.11s. Routing information is stored in each network node M in such cases which is updated on the basis of the periodically received routing requests. The shortest path of a network node M to the root node R is specified using the routing information. In such cases the next network nodes to which it routes received data packets is stored in each network node M.

Unidirectional data transmission paths from the individual network nodes M through to the root node R are set up via the routing requests sent out periodically by the root node R. Such a data transmission path is shown by way of example in FIG. 1 by the path sections L1 and L2, via which a network node at the lowest hierarchy level sends data packets to the root node R. The above-mentioned Tree-Building-Mode for establishing the data transmission paths contains a first mode and the second mode which specify whether individual network nodes M, in reaction to receive routing requests, send out proactive routing replies, which are referred to in the HWMP Standard as proactive path replies PREP, through to the root node R, in order to also establish a data transmission path in the opposite direction, i.e. from the root node through to the node M, whereby bidirectional data transmission paths are formed between the root node R and the respective network node M. The first mode in this case is the mode "proactive path request PREQ with proactive path reply PREP", after which a respective network node replies with a corresponding routing reply to establish bidirectional data transmission paths on receipt of a routing request. The second mode is the mode "Proactive Path Request PREQ without Proactive Path Reply PREP". After this mode is established the sending out of a routing reply is not coupled or is only coupled if necessary to the receipt of a routing request from the root network node. This means that the sending out of a routing reply generally does not occur as a reaction to the receipt of a routing request. Instead such a routing reply is only sent out if required, i.e. if a bidirectional data path between root node R and the respective network node M is needed.

To distinguish between the first and second mode just described a flag is contained in the routing requests of the root node R which indicates whether the first mode or the second mode is present. This flag is referred to below as the PREP Flag with, in the embodiment described here, a flag set to "1" indicating that the first mode is present and a flag set to "0" indicating that the second mode is present.

In the respective network node M two fields are contained in the above-mentioned routing information, which in the HWMP protocol are referred to as "proactive PREP" and "proactive PREP sent". These fields correspond to the two flags described in publication WO 2008/058933. The flag "proactive PREP" is referred to below as the first field and indicates whether the respective network node sends out a routing reply in response to a proactive routing request. In the embodiment described here a routing reply is sent out if the first field is in state "1" and no routing reply is sent out if the first field is in state "0". The second field "proactive PREP sent", which is referred to below as the second field, is used to indicate whether the respective network node has sent a proactive routing reply beforehand. In the exemplary embodiment described here a second field set to the state "1" means that a routing reply was sent and a field set the state "0" means that no routing reply was sent. This second field is always reset in accordance with prespecified criteria to the state "0".

The variants of the method described below are characterized by the fact that in a communication network a uniform mechanism for operation in the above first and second mode as well as for switching between the modes is created without an explicit distinction having to be made as to the mode in which the communication network is currently being operated.

The method will be explained below based on two exemplary embodiments which refer to FIG. 2 through FIG. 5. In these figures uniform designations are used, with the first field "proactive PREP" of a network node M being specified with reference character F1 and the second field "proactive PREP sent" of the network node M being specified with reference character F2. In addition proactive routing requests in which the first mode is indicated by the PREP Flag are designated REQ1 whereas routing requests in which the second mode is indicated by the PREQ flag are designated REQ2. Data sent out by network node M is designated D in the figures and corresponding proactive path replies sent are designated REP. The routing requests or routing replies below always involve proactive routing requests or routing replies so that the additional word "proactive" will also be omitted in some cases below.

FIGS. 2 to 5 show typical timing diagrams relating to a given network node M in the communication network, with the time axis extending in a vertical direction downwards and the states 0 and 1 of fields F1 and F2 in the node M being indicated by step-shaped lines. In addition the receipt of routing requests is indicated by corresponding arrows towards the step-shaped lines, whereas the sending out of data or routing replies by the network nodes is indicated by arrows in a direction away from the step-shaped lines. Different situations of sending out or receiving routing messages or data are designated by reference characters S1, S2, . . . , S48 in FIGS. 2 through 5.

The general concept of both exemplary embodiments described below can be summarized as follows:

There is no distinction between proactive routing requests in respect of the first or second mode specified therein, with the exception of one step. This means that the value of the PREP flag in the proactive routing requests is not generally taken into account.

The creation of a proactive routing reply REP is always dependent on the value of the first field in the respective node, i.e. if the first field is in the state "1" a routing reply REP is always sent, regardless of whether the routing request specifies the first or the second mode.

If a network node would like to send data packets to the root node R, the first field F1 in the network node will be set to "1" and this will be done regardless of whether the root node R specifies the first or second mode in its routing requests.

It is ensured that the first field is in the state "1" if the PREP field is set in the previously received proactive routing request to "1" and thereby specifies the first mode. If this condition is not fulfilled it is ensured that the first field is in the state "0".

The general concept just described will now be explained based on two alternate exemplary embodiments. Common to both embodiments is that a network node wishing to send data packets to the root node always sets the first field to the state "1". In addition the two embodiments agree that a network node which sends data packets as the source node to the root node using a bidirectional data transmission path sends out a proactive routing reply before the data packets to be transmitted if the second field is in the state "0".

The first and the second embodiment differ in the procedure in which a respective network node reacts to the receipt of the proactive routing request. In accordance with the first embodiment, which is also referred to as alternative A, the following three steps are executed one after the other in this case:

1. On receipt of the proactive routing request—independently of the mode specified in this request—the state of the second field in the network node is set to "0".
2. Subsequently the state of the first field in the network node is checked. In the event of the state of this first field being "1", a routing reply is sent from the network node through to the root node and the state of the first field is subsequently set to "0". In addition the state of the second field the network node is set to "1".
3. Subsequently the state of the PREP flag in the proactive routing request received is checked. If in accordance with this flag the first mode is specified, the network node sets its first field to a state of "1". If the second mode is specified, the state of the first field remains at "0".

In the second embodiment, which is also referred to below as variant B, a network node reacts to receiving a proactive routing request in another way and executes the following steps one after the other:

1. On receipt of a proactive routing request a check is first made as to the state of the first field of the receiving network node. If the first field is in the first state a proactive routing reply is sent out from the network node to the root node and the state of the second field of the network node is set to "1". If on the other hand the first field of the network node is in the second state, no routing reply is sent out by the network node and the state of the second field is set to "0". In this case the state of the first field remains "0".
2. A check is subsequently made as to which mode is specified in the received routing request. If the first mode is specified in accordance with the PREP flag in the routing request, the network node sets the state of the first field to "1". If the second mode is specified in the receipt routing request in accordance with the PREP flag, the first field of the network node is set to the state "0" instead. The second field remains unchanged in both cases.

Figure 2:
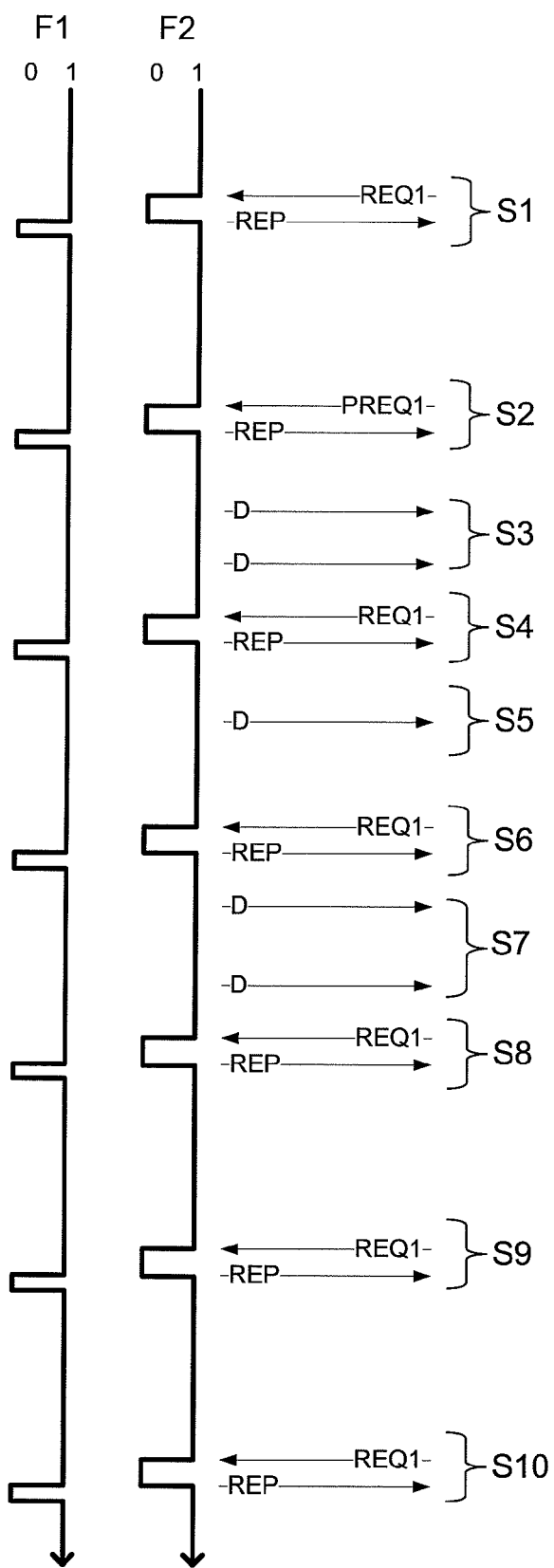
FIG. 2 shows a timing diagram which illustrates the sending out and receipt of routing messages and data in the first mode based on a first embodiment.

FIG. 2 shows a timing diagram to illustrate variant A in the event of the first mode being used exclusively in the routing protocol, i.e. proactive routing requests REQ1 being exclusively sent out by the root network node and received at the other network nodes. In the scenario of FIG. 2 the flag F1 of the network node in question is in state "1" and the field F2 is likewise in state "1". In accordance with the situation S1 a proactive routing request REQ1 with the first mode specified is received. As a consequence the second field F2 is set to a state of "0", while the field F1 remains in the state "1". As a consequence of the field F1 being in the state "1" a routing reply REP is sent out. Subsequently the second field F2 is set to the state "1" and the first field F1 to the state "0". Finally the check is made as to which mode is specified in the routing request. Since in this request the first mode is specified, the result is that the field F1 set to the state of "0" is set back to the state of "1" and remains in this state in the absence of further messages.

The situation S2 shows the same situation S1, in which the next routing request PREQ1 is received in the network node in question, in response to which a routing reply REP is again sent. In the situation S3 data packets D are sent twice from the network node to the root node, with it being assumed here and in all cases below that a bidirectional data path is to be used for the data transmission. Since, when the data packets D are sent, the state of the second field F2 is "1", no routing reply is sent out immediately before the sending of the data packets. In the situation S3, after the sending out of the respective data packet D, the state of the field F1 is set to "1". Since the state of the field F1 was previously already "1", this state will be retained. In the situation S4, which once again corresponds to the situations S1 and S2, a routing request REQ1 is received and subsequently a routing reply REP is sent. S5 again corresponds to situation S3, with data packets D now being sent out once. Subsequently situations S6, S7, S8, S9 and S10 are once again shown, with situations S6, S8, S9 and S10 again corresponding to situation S1 and the situation S7 again corresponding to situation S3.

Figure 3:
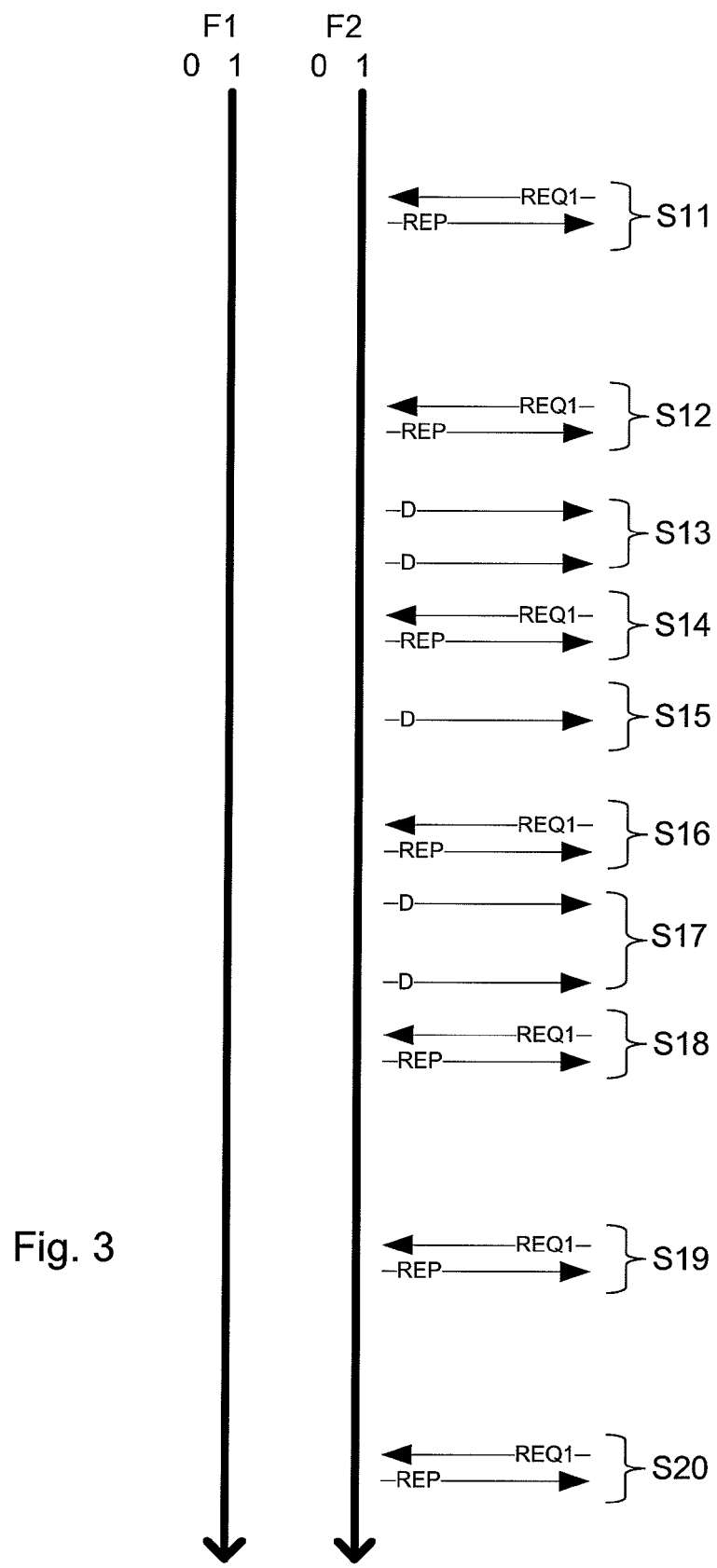
FIG. 3 shows a timing diagram which illustrates the sending out and receipt of routing messages and data in the first mode based on a second embodiment.

FIG. 3 shows a timing diagram for variant B of the method according to various embodiments with a routing based only on the first mode being used. At the beginning of the method the state of the field F1 is "1" and the state of the field F2 is likewise "1". On receipt of the first routing request REQ1 in the network node in question (situation S11) a check is first made as to the state of the first field F1. Since the state of this field is "1", a routing reply REP is sent out as a reaction to the routing request REQ1 and the state of the second field is set to "1". Subsequently a check is made in the network node as to which mode is specified in the routing request. Since the first mode is specified the result of this is that the state of the first field F1 is set to "1" and the state of the second field F2 remains at "1". Since the state of the fields was already "1" beforehand the state "1" is retained for the fields. Situation S12 corresponds to the situation S11 and will therefore not be explained again. In situation S13 data packets D are transferred twice from the network node to the root node. Since on transmission of the data packets the state of the second field F2 is "1", no routing reply REP is sent before the sending of the data packets D. Situation S14 once again corresponds to situation S11. Situation S15 corresponds to situation S13, with data packets D now only being sent out once however. Further situations S16 to S20 follow, with situations S16, S18, S19 and S20 corresponding to situations S11 or S12 respectively and situation S17 corresponding to situation S13.

Figure 4:
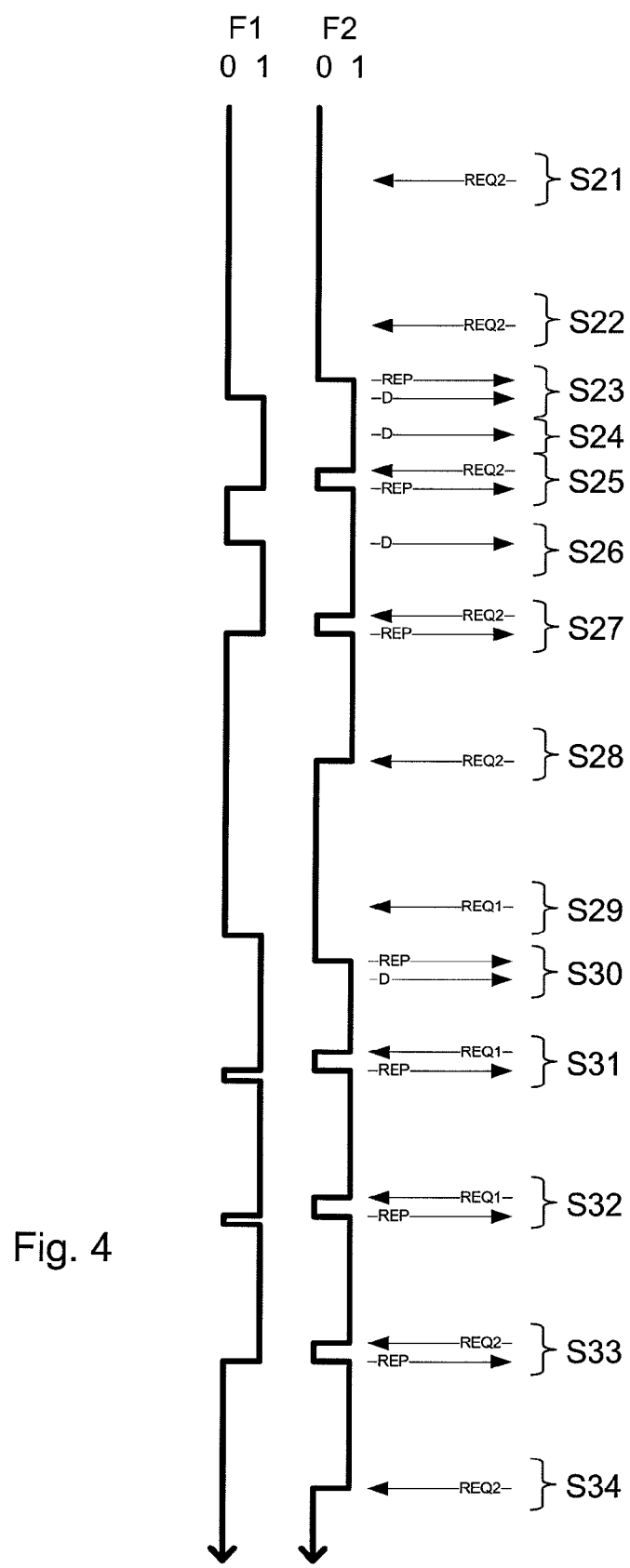
FIG. 4 shows a second timing diagram which illustrates the sending out and receipt of routing messages and data in accordance with the first embodiment in the first and second mode.

FIG. 4 shows a timing diagram in accordance with variant A, with a switch now being made between the first mode and the second mode. In this case the method is initially in the second mode in which routing requests REQ2 are sent out, in which the state of the PREQ flag is "0". At the beginning of the timing diagram the state of the first field F1 and the second field F2 of the network node in question is "0".

In situation S21 a routing request REQ2 is received by the network node in question. Regardless of the specified mode the state of the field F2 is initially set to "0" in this case. Since the state of field F2 is "0" it thus remains in this state. Subsequently the state of the first field is checked. Since the state of the first field is "0", no routing reply REP is sent out by the network node. Finally the mode specified in the routing request is checked again. Since the second mode is defined in the request REQ2, the result of this is that the first field F1 and the second field F2 remain unchanged. The situation S22 subsequently shown in FIG. 4 once again corresponds to situation S21, with the consequence that, after the receipt of the routing request REQ2, no routing reply is sent out and the states of the fields F1 and F2 are also not changed.

In situation S23 the network node intends to transmit data packets D. In this case it initially checks the state of the second field F2 before the beginning of the data transmission. Since the state of this field is "0", it sends a routing reply REP to the root node in order to establish a bidirectional data path by this method. The consequence of sending out the message REP is that the state of the flag F2 is subsequently set to "1". Finally the corresponding data packet D is transmitted, in response to which the state of the first field F1 is set to "1", regardless of which mode is present. Situation S24 shows another transmission of data packet D. In this case the state of the second field F2 is again checked before the data transmission. Unlike in situation S23, the state of the field is now "1" so that no routing reply REP is sent out before the data transmission D. The result of the data transmission is again that the state of field F1 is subsequently set to "1", with the state of the field F1 already being "1" beforehand and as a result the field remaining in this state.

In accordance with situation S25 a routing request REQ2 is once again received. This initially results in the state of the field F2 being set to "0". Subsequently the state of the first field F1 is checked. Since the state of the field F1 is "1" in situation S25, a routing reply REP is sent out by the network node and subsequently the state of the first field is set to "0" and the state of the second field to "1". Finally a further check is made as to which mode is specified in the routing request. Since the second mode is defined, the first field F1 and the second field F2 will not be changed. In accordance with situation S26 the network node once again sends out data packets D. In this case the state of the second field F2 has been checked before the sending out of the data packets D. Unlike in situation S23, the state of the second field F2 is "1" in this case. The result of this is that no routing reply is sent before the data packets D are sent out. During or after the sending of the data packets D the state of the first field F1 is set to "1".

The subsequent situation S27 corresponds to situation S25, with a routing reply REP being sent out by the network node in response to a routing request REQ2. In situation S28 the next routing request REQ2 is received in the network node. Initially in this case the state of the second field F2 is again set to "0". Subsequently the state of the first field F1 is checked. Since the state of the first field is "0" no routing reply is sent out by the network node and the state of the first field F1 and of the second field F2 remain unchanged. In accordance with situation S29 a switch from the second to the first mode is initiated. This is done by a routing request REQ1 with first mode specified therein now being sent out by the root node. In situation S29 the state of field F2 is initially set to "0", with the state "0" already being present beforehand and thus being retained. Subsequently the state of the first field F1 is checked. Since the state of the first field F1 is "0", no routing reply is sent out by the network node and the states of fields F1 and F2 remain unchanged. A check is subsequently made as to which mode is specified in the routing request. Since the first mode is now specified the result of this is that the state of the first field F1 is set to "1" and the second field remains unchanged. In situation S29 no routing reply is yet sent out on receipt of the routing request REQ1. However it is ensured that for all later routing requests a routing reply is sent since in situation S29 it has been ensured that the state of the first field F1 is set to "1".

In the subsequent situation S30 the network node intends to send data packets D to the root node. Before sending the data packets D it once again checks the state of the second field F2 in this case. Since the state of the second field is "0" it first sends a routing reply REP to the root node in order to establish a bidirectional data path in this way. The sending of the routing reply REP leads to the state of the second field being set to "1". Subsequently the data packets D are then sent out, with it being ensured that after the sending out of the data packets D the state of the first field is "1". This is achieved by explicitly setting the state of the first field to "1". Since the state of the field F1 was already "1" before the sending out of the data packets D, it thus remains in this state. Subsequently, in situation S31, a further routing request REQ1 is received. The initial consequence of this is that the state of the second field F2 is set to "0". Subsequently the state of the first field F1 is checked. Since the state of the field is now "1" this results in the sending out of a routing reply REP. After the reply is sent out the state of the first field is set to "0" and the state of the second field to "1". Finally the mode specified in the routing request is checked. Since the first mode is defined this results in the state of the first field F1 again being set to "1" while the state of the second field remains "1". Situation S32 shown in FIG. 4 corresponds to situation S31 and will thus not be explained in detail.

In situation S33 a mode switch from first to second mode is initiated. This is done by the sending out of a routing request REQ2 with the second mode specified. Initially, after receipt of this message, the state of the second field F2 is again set to "0". Subsequently the state of the first field F1 is checked. Since the state of field F1 is "1", a routing reply REP will be sent out. Subsequently the state of the first field is set to "0" and the state of the second field to "1". Subsequently the mode of the routing request is checked. Since the second mode is present, the first field and the second field are not changed.

Although the receipt of the routing message REQ2 in situation S33 again results in the sending out of a routing reply, in all subsequent routing requests REQ2 sending out of corresponding routing replies is suppressed. This is shown in situation S34. On receipt of the routing request REQ2 the network node again initially sets the state of field F2 to "0". Subsequently the state of field F1 is checked. Since the state of the field is now "0", no routing reply is sent out and the state of the fields F1 and F2 remain unchanged. Subsequently the mode specified in the routing request REQ2 is checked. Since the second mode is specified in this request, the state of the first field in the second field is not changed.

Figure 5:
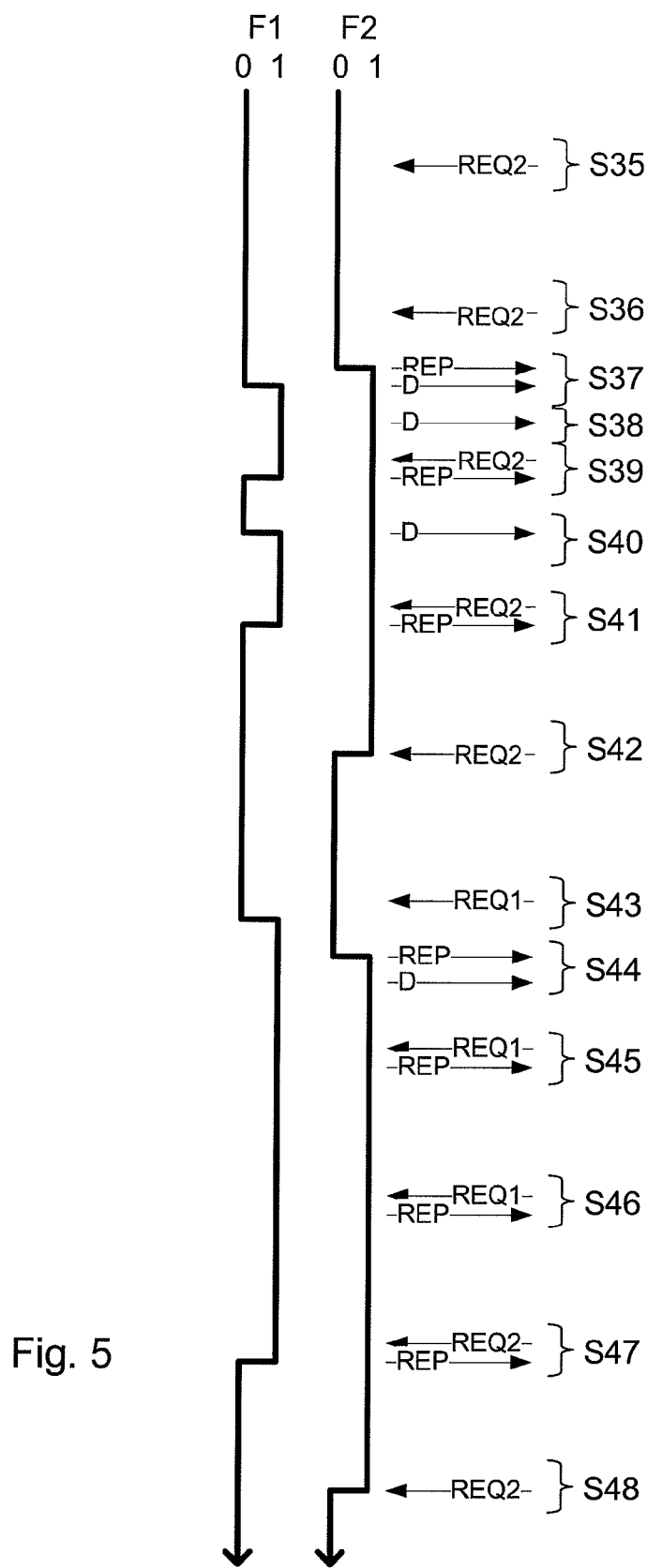
FIG. 5 shows a timing diagram which illustrates the sending out and receipt of routing messages and data in accordance with the second embodiment in the first and second mode.

FIG. 5 shows the timing diagram in accordance with variant B, with the figure showing a mode switch from the second to the first and from the first to the second mode. At the beginning of the timing diagram the second mode is present and the state of the first and second field F1 and F2 of the network node in question is "0". In situation S35 a routing request REQ2 with the second mode specified is received in the network node. In this case an initial check is made as to the state of the first field F1. Since the state of this field is "0" no routing reply REP is sent out by the network node and the state of the second field F2 is set to "0", with the state of the second field already having been "0" beforehand and thus remaining in this state. The state of the first field F1 is not changed. Situation S36 corresponds to situation S35, i.e. after receipt of the routing request REQ2 no reply is sent out by the network node.

In situation S37 the network intends to transmit data packets D. In this situation it first checks the state of the second field F2 before transmitting the data packets. Since the state of the second field is "0", it sends a routing reply REP before the transmission of the data packet D, in order to establish a bidirectional transmission path in this way. As a reaction to the subsequent sending of the data packet D, the network node then sets the state of field F1 to "1". In situation S38 a data packet D is again sent out by the network node. Before the data packet D is sent out a check is again made as to the state of field F2. Since the state of the second field is now "1" no routing reply REP is sent out beforehand. As a reaction to the sending out of the data packet D in situation S38 the state of the first field F1 is once again set to "1". Since the field is in this state, its state is unchanged after the sending out of the data packet.

In situation S39 the next routing request REQ2 is received in the network node. Once again the network node initially checks the state of the field F1. Since the state of the field is "1", a routing reply REP is sent out by the network node. Subsequently the state of the second field F2 of the network node is set to "1". Since the state of the field was already "1" beforehand, it also remains in this state. The state of the first field F1 is not changed. Finally a check is made as to which mode is specified in the routing request. Since the second mode is specified. The state of the first field is set to "0". The state of the second field F2 on the other hand is not changed.

In situation S40 a data packet D is sent by the network node through to the root node. In this case the network node again first checks the state of the second field F2. Since the state of the second field is "1" no routing reply REP is sent out before the data transmission. As a reaction to the transmission of the data packet D the state of the field F1 is subsequently set to "1". In situation S41 the next routing request REQ2 is received in the network node. Situation S41 corresponds here to situation S39, which has been described in detail above. For the purpose of avoiding repetition the reader is referred to this description. In situation S42 the next routing request REQ2 is received in the network node. In this case a check is again first made as to the state of the field F1. Since the state of this field is "0", no routing reply is sent out by the network node. Subsequently the state of the second field F2 is set to "0" while the first field F1 remains unchanged. Finally a check is made as to the mode specified in the routing request. Since the second mode is defined in this routing request the state of the first field is set to "0", with this state already being present and thus not being changed. No changes are made to the state of the second field F2, i.e. the state of the second field F2 remains "0".

In situation S43 a switch is now made from the second to the first mode. For this purpose a routing request REQ1 is sent out by the route network node with the first mode specified. Once again an initial check is made by the network node as to the state of the first field F1. Since the state of the field F1 is "0" no routing reply REP is sent out by the network node. Furthermore the state of the second field F2 is set to "0", with the field having already previously been in this state "0" so that it does not change its state. The state of the first field F1 is not changed. Subsequently the mode specified in the routing request is checked. Since the first mode is defined in the routing request the state of the first field is set to "1". The state of the second field on the other hand remains unchanged. Like the embodiment described in FIG. 4, for a mode switch in step S43 there is initially no routing reply REP yet sent out in response to the received routing request REQ1. Since the state of the first field F1 is now "1" however, it is ensured that a routing reply will also be sent on receipt of the next routing requests.

In situation S44 the network node sends a data packet D to the root node. In this case, before sending the data packet, it initially checks the state of the second field F2. Since the state of the second field F2 is "0" it sends a routing reply REP beforehand the in order to establish a bidirectional data path in this way. Subsequently the data packet D is sent. As a reaction to the sending of the data packet D the state of the field F1 is then set to "1", with the state of the field F1 already being "1" beforehand, so that its state is unchanged. In situation S45 the next routing request REQ1 is received in the network node. Initially the state of field F1 is checked again. Since the state of field F1 is now "1", a routing reply REP is sent out. Subsequently the state of the second field is set to "1" with the state of the second field having already previously been "1" so that this state is not changed. No changes are made to the state of the first field. Finally a further check is made as to which mode is specified in the routing request REQ1. Since the first mode is specified the state of the first field is set to "1", with the state of the first field having already previously been "1" so that no state change occurs. The state of the second field by contrast is not changed. The next situation S46 corresponds to situation S45 and will therefore not be explained in detail any further. Similarly to situation S45, the receipt of a routing request REQ1 results in the sending out of a routing reply REP.

In situation S47 a switch is carried out from the first mode to the second mode. This is initiated by the sending out of a routing request REQ2 with the second mode specified. On receipt of the routing request REQ2, the network node initially again checks the state of the field F1. Since the state of the field F1 is "1", a routing reply REP is sent out by the network node. The state of the second field is also set to "1" with the state of the field already having been "1" so that the state does not change. By contrast no changes are made to field F1. Finally another check is made by the network node as to the mode specified in the routing request. Since the second mode is now specified the state of the field F1 is now set to "0". By contrast the state of the second field F2 is not changed. In situation S47, for a mode switch, a routing reply REP is initially sent in response to the routing request REQ2. For all later routing requests REQ2 however a routing reply is no longer sent out since the state of field F1 is now "0". This can be seen in situation S48. There the next routing request REQ2 is received. Initially the state of the first field F1 is checked again. Since the state of the field F1 is now "0", no routing reply REP is sent out by the network node. The state of the second field is also set to "0", while the state of the first field F1 remains unchanged.

As emerges from the description of the above FIGS. 4 and 5, a switch of mode results in the mode only finally being configured on receipt of the next routing request. This results in a delay in configuring the corresponding mode. In order to avoid such a delay on switching from the second to the first mode, i.e. to ensure that a routing reply is already sent on receipt of a routing request with the first mode specified, the two variants described above can be expanded by the following rules. If the received routing request specifies the first mode and simultaneously the state of the first field F1 of the network node receiving the routing request is "0", a routing reply REP is immediately sent out to the root node. Subsequently the state of both the first field F1 and the second field F2 is set to "1".

As emerges from the preceding remarks, in accordance with the two described variants a mechanism is created for how the corresponding first and second mode can be realized in the proactive tree building mode. This uniform mechanism results in low implementation effort and also makes it possible to switch easily between the two modes.

What is claimed is:

1. A method for exchange of routing messages in a wireless meshed communication network comprising a plurality of network nodes, wherein one of the network nodes is a root node which represents the root of a routing tree of the wireless meshed communication network, and wherein the routing tree comprises data transmission paths between the root node and the remaining network nodes, the method comprising:
    sending by the root node routing requests at regular intervals to the network nodes for establishing the data transmission paths, wherein in the respective routing request a first mode for setting up bidirectional data transmission paths or a second mode for setting up unidirectional data transmission paths is specified;
    providing a first flag in each network node which can be set into a first or second state;
    if upon receipt of a routing request in a respective network node the first flag of the respective network node is in a first state, a routing reply is always sent out by the respective network node otherwise no routing reply is sent out by the respective network node, wherein subsequently the mode specified in the received routing request is checked by the respective network node, wherein it is ensured that the first flag is in the first state if the received routing request specifies the first mode and otherwise it is ensured that the first flag is in the second state;
    ensuring by a respective network node in the event of the data transmission from the respective network node to the root node that the first flag of the respective network node is in the first state.

2. The method according to claim 1, wherein each network node provides for a second flag which can be set into a first or second state, wherein the respective network node sets the second flag to the first state after the sending out of a routing reply.

3. The method according to claim 2, wherein in a respective network node, after receiving a routing request, the following steps: a) to c) are always executed one after the other:
    a) Setting the second flag of the respective network node to the second state;
    b) Checking the value of the first flag of the respective network node, whereby
        if the first flag is in the first state, a routing reply is sent out by the respective network node and subsequently the first flag is set to the second state and the second flag is set the first state;
        if the first flag is in the second state, no routing reply is sent out by the respective network node and the first flag and the second flag remain unchanged;
    c) Checking the mode which is specified in the received routing request, whereby
        if the first mode is specified in the received routing request, the first flag is set to the first state and the second flag remains unchanged;
        if the second mode is specified in the received routing request, the first flag and the second flag remain unchanged.

4. The method according to claim 2, wherein in a respective network node in response to the receipt of a routing request the following steps: i) and ii) are always executed one after the other:
    i) Checking the value of the first flag of the respective network node, whereby
        if the first flag is in the first state a routing reply is sent out by the respective network node, the second flag of the respective network node is set to the first state and the first flag remains unchanged;

if the first flag is in the second state, no routing reply is sent out by the respective network node and the second flag is set to the second state and the first flag remains unchanged;

ii) Checking the mode which is specified in the received routing request, whereby if the first mode is specified in the received routing request, the first flag is set to the first state and the second flag remains unchanged;

if the second mode is specified in the received routing request, the first flag is set to the second state and the second flag remains unchanged.

5. The method according to claim 2, wherein a respective network node depending on one or more criteria always executes the following step:

Sending a routing reply before the beginning of the data transmission from the respective network node through to the root node if the second flag of the respective network node is in the second state.

6. The method according to claim 2, wherein if in a respective network node a routing request specifying a first mode is received and the first flag is in the second state, a routing reply is sent out by the respective network node in response to the received routing request and if in a respective network node a routing request specifying a first mode is received and the first flag is in the second state, after the sending out of the routing reply in the second network node the first flag is also set to the first state and the second flag is set to the first state.

7. The method according to claim 2, wherein the first state of the first flag is a logic 0 and the second state of the first flag is a logic 1 and wherein the first state of the second flag is a logic 0 and the second state of the second flag is a logic 1.

8. The method according to claim 1, wherein, if in a respective network node a routing request specifying a first mode is received and the first flag is in the second state, a routing reply is sent out by the respective network node in response to the received routing request.

9. The method according to claim 1, wherein the wireless meshed communication network operates in accordance with IEEE 802.11s and the routing requests and routing replies are proactive Path Requests and Path Replies in accordance with the Hybrid Wireless Mesh Protocol (HWMP).

10. A network node for use in a wireless meshed communication network, with a routing tree being established in the wireless meshed communication network with data transmission paths between the network nodes and one of the network nodes being a root node which represents the root of the routing tree, wherein a network node comprising:

a first means for receiving routing requests, which the root node sends out at regular intervals to the network nodes for setting up the data transmission paths, wherein a first mode for setting up bidirectional data transmission paths or a second mode for setting up unidirectional data transmission paths is specified in a respective routing request;

a second means for setting a first or second value in a first flag;

a third means for sending out routing replies, which is designed such that, if upon receipt of a routing request by the first means the first flag of the network node has the first value, a routing reply is always sent out by the third means and otherwise no routing reply is sent out by the third means, wherein the mode specified in the received routing request is subsequently checked, wherein it is ensured that the first flag has the first value if the received routing request specifies the first mode, and otherwise that the first flag has the second value, wherein it is further ensured that in the event of a data transmission from the network node to the root node the first flag has the first value.

11. The network node according to claim 10, wherein the network comprises a second flag which may have a first or second value, with the respective network node setting the second flag to the first value after the sending out of a routing reply.

12. A wireless meshed communication network with a plurality of network nodes, in which a root node is configured to send routing requests at regular intervals to the network nodes for establishing data transmission paths, wherein a first mode for setting up bidirectional data transmission paths or a second mode for setting up unidirectional data transmission paths is specified in the respective routing request;

and wherein the network nodes are configured:

to indicate a state of the respective network node by a first flag in the respective network node;

if upon receipt of a routing request in a respective network node the first flag of the respective network node has a first value, to always send out a routing reply by the respective network node and otherwise to not send a routing reply out, and to subsequently check the mode specified in the received routing request by the respective network node, and to ensure that the first flag has the first value if the received routing request specifies the first mode and otherwise that the first flag has the second value; and to ensure by a respective network node in the event of the data transmission from the respective network node to the root node that the first flag of the respective network node has the first value.

13. The wireless meshed communication network according to claim 12, wherein in a respective network node the state of the respective network node is further indicated by a second flag which can be set to a first or second value, with the respective network node setting the second flag to the first value after the sending out of a routing reply.

14. The wireless meshed communication network according to claim 13, wherein a respective network node, in response to the receipt of a routing request, is configured to execute the following steps a) to c) always one after the other:

a) Setting the second flag of the respective network node to the second value;

b) Checking the state of the first flag of the respective network node, whereby if the first flag has the first value, a routing reply is sent out by the respective network node and subsequently the first flag is set to the second value and the second flag has the first value;

if the first flag has the second value, no routing reply is sent out by the respective network node and the first flag and the second flag remain unchanged;

c) Checking the mode which is specified in the received routing request, whereby if the first mode is specified in the received routing request, the first flag is set to the first value and the second flag remains unchanged;

if the second mode is specified in the received routing request, the first flag and the second flag remain unchanged.

15. The wireless meshed communication network according to claim 13, wherein a respective network node in response to the receipt of a routing request is configured to execute the following steps i) and ii) always one after the other:
  i) Checking the state of the first flag of the respective network node, whereby
    if the first flag has the first value a routing reply is sent out by the respective network node, the second flag of the respective network node is set to the third first value and the first flag remains unchanged;
    if the first flag has the second value, no routing reply is sent out by the respective network node and the second flag is set to the second value and the first flag remains unchanged;
  ii) Checking the mode which is specified in the received routing request, whereby
    if the first mode is specified in the received routing request, the first flag is set to the first value and the second flag remains unchanged;
    if the second mode is specified in the received routing request, the first flag in is set the second value and the second flag remains unchanged.

16. The wireless meshed communication network according to claim 13, wherein a respective network node depending on one or more criteria always is configured to execute the following step:
  Sending a routing reply before the beginning of the data transmission from the respective network node to the root node if the second flag of the respective network node has the second value.

17. The wireless meshed communication network according to claim 13, wherein if in a respective network node a routing request specifying a first mode is received and the first flag has the second value, the respective network node is configured to send out a routing reply in response to the received routing request and if in a respective network node a routing request specifying a first mode is received and the first flag has the second value, after the sending out of the routing reply in the second network node the first flag is also set to the first value and the second flag is set to the first value.

18. The wireless meshed communication network according to claim 12, wherein, if in a respective network node a routing request specifying a first mode is received and the first flag has the second value, the respective network node is configured to send out a routing reply in response to the received routing request.

19. The wireless meshed communication network according to claim 12, wherein the wireless meshed communication network operates in accordance with IEEE 802.11s and the routing requests and routing replies are proactive Path Requests and Path Replies in accordance with the Hybrid Wireless Mesh Protocol (HWMP) of this standard.

20. The wireless meshed communication network according to claim 12, wherein the first value of the first flag is a logic 0 and the second value of the first flag is a logic 1 and wherein the first value of the second flag is a logic 0 and the second value of the second flag is a logic 1.

* * * * *